Patented July 19, 1949

2,476,845

UNITED STATES PATENT OFFICE 2,476,845

FLUID FOR DRILLING WELLS

Reginald D. Dawson, Berkeley, Calif., assignor to Shell Development Company, San Francisco, Calif., a corporation of Delaware No Drawing. Application June 7, 1946, Serial No. 675,299

4 Claims. (Cl. 252—8.5)

This invention relates to the drilling of oil and gas wells and pertains more particularly to the use and composition of an improved drilling fluid.

Fluids commonly used for the drilling of oil and gas wells are water-base drilling fluids, comprising for example a clay suspended in water, and oil-base drilling fluids comprising, for example, calcium carbonate suspended in a mineral oil.

It has also been proposed to use as drilling fluids certain emulsions of mineral oil in water or of water in mineral oil, formed by means of emulsifiers such as sulfuric acid, soaps of fatty acids, for example, sodium or potassium oleate, emulsoid colloids, for example, starch, sodium alginates, etc. Suitable quantities of clay, silica, carbonate and other materials are added to these emulsions to improve their properties and control their weight.

The use of drilling emulsions has several advantages over the use of either water-base or oil-base drilling fluids.

Drilling emulsions are generally superior to water-base drilling fluids in forming a very thin and substantially fluid-impervious mudsheath on the walls of a borehole, in eliminating fluid loss to the formation with ensuing contamination of producing formations by an aqueous liquids, etc.

Drilling emulsions are generally superior to oil-base drilling fluids from the point of view of costs, ease of handling, suitability for electrical logging, etc.

The disadvantage for general use of drilling emulsions is, however, their lack of stability in the presence of even moderately high concentrations of electrolytes, such as brines entering the borehole from the formation and becoming admixed to the drilling fluid.

Thus, drilling emulsions formed by means of the emulsifiers listed above, and especially those comprising soaps as emulsifiers, break down immediately, or after a few hours of use or storage, upon contamination with ordinary sodium chloride salt in concentrations as low as 0.5% of salt in the water phase, and especially with calcium or magnesium salts in concentrations as low as for example 0.15 percent of salt in the water phase.

It is therefore the object of this invention to provide an improved drilling emulsion or emulsion fluid which is substantially stable in the presence of contaminating formation salts or brines, said emulsion being formed by means of lignosulphonic acid emulsifying agents, that is, emulsifiers derived from sulfonated lignin or lignosulphonic acid.

It is also an object of this invention to provide a well drilling emulsion having extremely good plastering properties (low filter loss), which are in no way subject to deterioration upon contamination with formation salts.

Lignosulphonic acid or acids are usually obtained in the form of complex mixtures in the production of paper pulp by the sulphite process, wherein wood or straw is digested with an acid calcium, magnesium or sodium sulphite solution at high temperatures, so that the lignin of the wood or straw goes into solution as a salt of lignosulphonic acid. The sulphonated lignin may be recovered from the waste liquor by various methods involving precipitation or double decomposition by calcium or sodium chlorides, mineral acids, lime water, basic lead acetate, organic bases, etc.

Sulphonated lignin, lignosulphonic acid and compounds or derivatives thereof, such as organic or inorganic, and especially metallic salts thereof, for example, alkali, alkaline earth lignosulphonates, such as magnesium, sodium and potassium lignosulphonates, have now been found to be extremely suitable emulsifying agents in forming stable drilling emulsions which are not subject to settling or deterioration upon contamination by formation brines and fluids.

Although it is not desired to advance here any theories on this subject, it is believed that the above compounds, in particular the metallic lignosulphonates such as sodium, calcium and magnesium lignosulphonates are of outstanding effectiveness as emulsifying and stabilizing agents for drilling emulsions because they act as protective colloids in the presence of the contaminating formation fluids which usually comprise sodium, calcium or magnesium ions.

These lignosulphonic acid compounds are non-hygroscopic and will remain as free flowing powders during storage. They possess a satisfactory stability both in dry and in liquid form, and thus can be stored and used in either form, their concentration and pH being readily adjustable for the desired purpose. At their normal degree of sulphonation, they are readily soluble in water under all pH conditions to give colloidal solutions or dispersions, thus acting to form and stabilize emulsions.

Various methods may be selectively used in forming well drilling emulsions by means of these emulsifying agents according to the present invention.

If it is desired to prepare a very light or low specific gravity drilling emulsion, a mineral oil, such as crude oil, gas oil, Diesel oil, etc. may be emulsified directly in water by means of a high speed hopper or of jet device such as a so-called mud-gun, a relatively small quantity, such as 0.5–5.0 percent (calculated on the total weight of the emulsion) of a lignosulphonic acid or compound thereof being added to form and stabilize the emulsion. Depending on the specific gravity of the mineral oil, which should preferably be of a range from 10 to 40° A. P. I., and on the particular specific gravity of the drilling emulsion which it is thus desired to obtain for a particular purpose, for example, for drilling through low pressure formations, the proportions in which oil is emulsified in water may be varied within fairly wide limits, although a ratio of about 25 to 50 percent by volume of the mineral oil to about 75 to 50 percent of water has been found to give especially favorable results.

In order to form the present emulsions, to give thereto a greater consistency, and to increase their capacity for carrying drill cutting, various amounts of a finely divided solid colloidal material may be admixed to said emulsions, preferably during the emulsification process. Thus, bentonite may be added in amounts from 1 to 5 percent, or ordinary drilling clay in amounts from 1 to 20 percent by weight on the total weight of the emulsion.

Furthermore, the weight or specific gravity of the present emulsions can be accurately controlled by adding thereto, in a suitably comminuted form, any desired weighting material such as calcium carbonate, barytes, iron oxide, galena, etc. These materials have been found to remain stably suspended in the present emulsions, while maintaining the specific gravity thereof within any desired range, such as from 65 lbs. to 140 lbs. per cubic foot.

Since the present emulsions are used on drilling installations wherein a drilling fluid of either the water-base or the oil-base type is usually already available, it has been found advantageous to apply the emulsifying agents of the present invention in forming drilling emulsions with these drilling fluids as starting material.

Thus, a water-base drilling fluid comprising water and clay and having a weight such for example as 86 lbs. per cubic foot, may be mixed with approximately 25 to 50 percent by volume of a heavy crude oil with the addition of 0.5 to 5.0 percent (calculated on the weight of the total mixture) of a lignosulphonic emulsifying agent such for example as sodium lignosulphonate, to give a stable emulsion having a weight of approximately 82 to 72 lbs. per cubic foot.

Likewise, an oil-base drilling fluid comprising for example crude oil or a Diesel oil and calcium carbonate suspended therein by means of agents such as tall oil and sodium silicate or hydroxide, as described in Patent No. 2,350,154, and having a weight such for example as 78 lbs. per cubic foot, may be mixed with approximately from one to three times its volume of water and emulsified therewith with the addition of a lignosulphonic agent such as calcium lignosulphonate to give a stable emulsion having a weight of approximately 70 to 66 lbs. per cubic foot.

In this connection, it is especially important to note that the emulsifying action of the present lignosulphonic agents is not in any way impaired by any chemical compounds which may have been previously used in controlling the viscosity, stability or other properties of such water-base or oil-base drilling fluids.

The drilling emulsions formed in the ways described hereinabove have the following advantages over water-base and oil-base drilling fluids: (1) they are considerably cheaper than oil-base drilling fluids, whereby drilling costs are greatly decreased; (2) their plastering properties are much superior to those of water-base drilling fluids and compare favorably with those of oil-base drilling fluids, whereby filtering losses to the formation are greatly minimized; (3) they are much better adapted than oil-base drilling fluids for surveying wells by electrical logging methods; (4) greater drilling speeds can in certain uses be realized with the drilling emulsions of the present type than with either water-base or oil-base drilling fluids.

The superior properties of the drilling emulsions formed according to the present invention, and their suitability for well drilling operations will further be clearly seen from the following examples:

*Example I*

A water-base mud having a weight of 75 lbs./cu. ft., treated with sodium hexametaphosphate to decrease its viscosity, was emulsified with a stove oil in a ratio of 3:1.

3 percent of sodium oleate was used as the emulsifier.

The emulsion had a fluid loss of 3.2 cc. (Daroid tester, 30 minutes, 100 lbs./sq. in. at 20° C.) and 10.11 cc. (500 lbs. at 80° C.). Upon 3.5 percent of sodium chloride being added to the emulsion, the fluid loss rose to 31.1 cc. and the emulsion broke.

*Example II*

An emulsion was prepared with the same proportions of the same components as in Example I, calcium lignosulphonate being however substituted for sodium oleate as the emulsifier. The fluid loss was 2.2 cc. at 100 lbs./sq. in. and 20° C., and 6.6 cc. at 500 lbs./sq. in and 80° C.

Upon 3.5 percent of sodium chloride being added to the emulsion, the fluid loss at 100 lbs./sq. in. and 20° C. dropped to 1.6 cc. and the emulsion remained stable.

Upon 5 percent of calcium sulfate being further added to the emulsion already contaminated with the sodium chloride, the fluid loss remained at its former value of 1.6 cc. A test ran at 500 lbs. and 80° C. gave a fluid loss of 4.2 cc. The emulsion remained stable in all cases.

*Example III*

An emulsion was prepared as in Eaxmples I and II, 3 percent of sodium lignosulphonate being used as the emulsifier. The fluid loss was 3.0 cc. at 100 lbs./sq. in. and 20° C., and 9.1 cc. at 500 lbs./sq. in. and 80° C.

Upon the addition of 3.5 percent sodium chloride and 5 percent of calcium sulphate, the fluid loss dropped to 2.8 cc. at 100 lbs./sq. in. and 20° C., and to 8.6 cc. at 500 lbs./sq. in. and 80° C. The emulsion remained stable.

I claim as my invention:

1. A well drilling emulsion containing from 50 to 75 percent of water and from 50 to 25 percent of mineral oil emulsified therewith, said mineral oil having a density of from 10 to 40° A. P. I., and a small quantity of from 0.5 to 5.0 percent of a lignosulphonic acid emulsifying agent.

2. A well drilling emulsion containing 50 to 75 percent of water, 50 to 25 percent of mineral oil of from 10 to 40° A. P. I. density emulsified therewith, a quantity of finely dispersed solid material sufficient to give said emulsion a density of from 65 to 140 lbs. per cubic foot, and a quantity of from 0.5 to 5.0 percent of a lignosulphonic acid emulsifying agent.

3. A well drilling emulsion containing 50 to 75 percent of water, 50 to 25 percent of mineral oil of from 10 to 40° A. P. I. density emulsified therewith, a quantity of finely dispersed solid material sufficient to give said emulsion a density of from 65 to 140 lbs. per cubic foot, said material comprising colloidal matter, and a quantity of from 0.5 to 5.0 percent of a lignosulphonic acid emulsifying agent.

4. A well drilling emulsion containing from 50 to 75 percent of water and from 50 to 25 percent of mineral oil emulsified therein, said mineral oil having a density of from 10 to 40° A. P. I. and a small quantity of from 0.5 to 5.0 percent of a lignosulphonate emulsifying agent.

REGINALD D. DAWSON.

REFERENCES CITED

The following references are of record in the file of this patent:

UNITED STATES PATENTS

| Number | Name | Date |
|---|---|---|
| 1,107,020 | Berend | Aug. 11, 1914 |
| 1,201,301 | Hurt | Oct. 17, 1916 |
| 1,444,844 | McElroy | Feb. 13, 1923 |
| 1,450,685 | Kirschbraun | Apr. 3, 1923 |
| 1,895,775 | Smith | Jan. 31, 1933 |
| 2,151,029 | Henst | Mar. 21, 1939 |
| 2,343,860 | Bencowitz | Mar. 14, 1944 |
| 2,360,992 | Weiss | Oct. 24, 1944 |
| 2,380,156 | Dobson et al. | July 10, 1945 |